(12) United States Patent
Tsuchiya (10) Patent No.: US 9,358,739 B2
(45) Date of Patent: Jun. 7, 2016

(54) METHOD FOR PRODUCTION OF HEAT-RESISTANT CONTAINER

(75) Inventor: Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 647 days.

(21) Appl. No.: 13/806,027

(22) PCT Filed: Jun. 16, 2011

(86) PCT No.: PCT/JP2011/063839
§ 371 (c)(1),
(2), (4) Date: Dec. 20, 2012

(87) PCT Pub. No.: WO2012/002164
PCT Pub. Date: Jan. 5, 2012

(65) Prior Publication Data
US 2013/0087954 A1    Apr. 11, 2013

(30) Foreign Application Priority Data

Jun. 28, 2010 (JP) ................................ 2010-146876

(51) Int. Cl.
- *B29D 22/00* (2006.01)
- *B29C 49/18* (2006.01)
- *B65D 1/02* (2006.01)
- *B29C 49/54* (2006.01)

(52) U.S. Cl.
CPC ............ *B29D 22/003* (2013.01); *B29C 49/185* (2013.01); *B29C 49/541* (2013.01); *B65D 1/0261* (2013.01)

(58) Field of Classification Search
CPC ...... B29D 22/003; B29C 49/00; B29C 57/08; B29C 2049/4807; B29C 49/30; B29C 49/541; B65D 1/0261
USPC .......................................................... 264/531
See application file for complete search history.

(56) References Cited

U.S. PATENT DOCUMENTS

| | | | | |
|---|---|---|---|---|
| 5,389,332 | A | * | 2/1995 | Amari et al. .................. 264/530 |
| 6,299,007 | B1 | * | 10/2001 | Takeuchi ....................... 215/373 |
| 2004/0232103 | A1 | * | 11/2004 | Lisch et al. ................... 215/374 |
| 2011/0113731 | A1 | | 5/2011 | Bysick et al. |
| 2011/0233166 | A1 | | 9/2011 | Hiromichi et al. |

FOREIGN PATENT DOCUMENTS

| | | |
|---|---|---|
| JP | 11-333912 | 12/1999 |
| JP | 2006-315693 | 11/2006 |
| JP | 2008-254244 | 10/2008 |
| JP | 2009-154943 | 7/2009 |
| JP | 2009-298485 | 12/2009 |

* cited by examiner

*Primary Examiner* — Monica Huson
(74) *Attorney, Agent, or Firm* — David L. Hoffman; Hoffman Patent Group (57) ABSTRACT

An invention of a method for production of a heat-resistant container, in which a raised bottom portion is displaced inwardly by reduction in internal pressure, is disclosed. The method is characterized by forming a raised bottom portion 11 smaller in wall thickness than a surrounding wall portion 12a by first blow molding using a heat-treating blow mold; and pushing up the raised bottom portion 11 by a secondary bottom mold, in performing second blow molding using a final blow mold, to increase the wall thickness of the surrounding wall portion 12a (ground portion 12) relative to the raised bottom portion.

5 Claims, 7 Drawing Sheets

METHOD FOR PRODUCTION OF HEAT-RESISTANT CONTAINER

BACKGROUND

1. Technical Field

This invention relates to a method for production of a heat-resistant container, the method preparing a heat-resistant container of resin by blow molding.

2. Background Art

Containers prepared by blow molding using polyethylene terephthalate (PET) as a resin are known. Containers made of PET are excellent in transparency, toughness, sanitary aspects, etc., and are used as containers of various contents. Currently, they find widespread use, particularly, as containers containing liquid materials such as beverages. Recently, their applications spread further, and wide-mouthed containers containing semisolid materials such as jam and pasta sauce are beginning to appear. A heat-resistant container, one of the PET containers, can be filled with any of such foods and beverages heated to high temperatures for sterilization.

This type of container is filled with a material which will become contents and which have been heated to a high temperature (e.g., about 90° C.) for heat sterilization. The container with the contents is sealed with a lid, and then cooled. During this cooling, the interior of the bottle has an atmosphere at reduced pressure, as the volume of the contents decreases, or the volume of a gas remaining in a space on the mouth side (head space) formed above the contents decreases. At this time, a barrel section of the bottle may be deformed under reduced pressure within the bottle. This is undesirable in terms of appearance. With the container used under high-temperature filling conditions, therefore, deformation due to reduced pressure inside the container needs to be accommodated. For this purpose, it is common practice to form a plurality of flexible panels in the barrel section of the container. To increase rigidity and suppress deformation, moreover, use is made of a structure having three-dimensional portions (also called ribs) provided in a wall section of the container (see, for example, Patent Documents 1 and 2).

By such means as providing the vacuum panel portions in the wall section of the heat-resistant container, deformation of the heat-resistant container if the interior is brought into a reduced-pressure atmosphere because of the reduced volume of the contents. This avoids a situation where the appearance deteriorates to lower the commercial value of the heat-resistant container.

Provision of such panels or ribs, however, requires the formation of many irregularities in the container. Hence, the shape of the mold becomes complicated, relatively large amounts of material are needed at the time of molding, and thus costs are high. The container itself is inevitably heavy, contrary to the recent demand for the weight reduction of containers.

If the vacuum panel portions or three-dimensional portions are provided in the wall section, a space for the disposition of a product label is limited, so that restrictions are imposed on the design of the label and the contents of its indications. If the vacuum panel portions, for example, are provided in the heat-resistant container, moreover, stepped parts are created in the wall surface. If the container is applied, for example, as a wide-mouthed heat-resistant container to be filled with a food such as jam or mayonnaise, there may be a part, to which a spoon or the like does not reach, in a range where the spoon or the like scoops the contents, and the contents may fail to be used up.

Particularly when a heat-resistant container is applied as a wide-mouthed food container which is filled with a semisolid food, therefore, a measure against deformation due to a reduced-pressure atmosphere is indispensable. Nonetheless, the wall surface still needs to be kept as flat as possible for increased commercial value.

PRIOR ART DOCUMENTS

Patent Documents

Patent Document 1: JP-A-2006-315693
Patent Document 2: JP-A-2009-298485

SUMMARY

Problems to be Solved by the Invention

The present invention has been accomplished in the light of the above-mentioned circumstances. It is an object of the invention to provide a method for production of a heat-resistant container, which can mold a heat-resistant container capable of coping unerringly with deformation due to a reduced-pressure atmosphere regardless of the shape of the wall surface of the container.

Means for Solving the Problems

A method for production of a heat-resistant container according to a first embodiment of the present invention, intended to attain the above object, comprises: forming a raised bottom portion, which is smaller in wall thickness than a surrounding section, in a bottom section of a molded product; pressing a site of the bottom section from outside, simultaneously with performing blow molding, thereby forming a folded-back portion and a surrounding wall portion in surroundings of the raised bottom portion; and increasing wall thickness of the surrounding wall portion relative to the wall thickness of the raised bottom portion, and displacing the raised bottom portion inwardly by reduction of internal pressure.

With the present invention according to such first embodiment, blow molding is performed, with the folded-back portion and the raised bottom portion thinner than the surrounding wall portion being pressed from outside. This procedure produces a molded product provided with a bottom section having the thin-walled raised bottom portion (folded-back portion) and the thick-walled surrounding section. When the interior of the product falls into a reduced-pressure atmosphere, the raised bottom portion is displaced toward the interior to accommodate pressure reduction. Thus, the deformation of the wall surface can be eliminated, regardless of the shape of the wall surface.

The method for production of a heat-resistant container in the present invention according to a second embodiment is the method for production of a heat-resistant container according to the first embodiment, characterized by forming the raised bottom portion smaller in wall thickness than the surrounding wall portion by first blow molding involving heat treatment; and pressing the site of the bottom section including the folded-back portion and the surrounding wall portion, in performing second blow molding using a final mold, to increase the wall thickness of the surrounding wall portion relative to the wall thickness of the raised bottom portion.

With the present invention according to the second embodiment, the first blow molding, for example, blow molding at a mold temperature of 140° C. to 200° C., promotes crystallization, removes internal stress, and forms the raised bottom portion thinner than the surrounding wall portion. The second blow molding, for example, blow molding at a mold temperature of 80° C. to 120° C., promotes crystallization, carries out final shaping, and simultaneously presses the raised bottom portion from outside to render the surrounding wall portion thick-walled.

In the first blow molding, the highly stretched and oriented thin-walled raised bottom portion can be easily formed by the heat-treating blow mold having a cavity space larger than the final product, and the bottom mold having a convex portion protruding toward the cavity. In the second blow molding, when the bottom part of the first blow molded product approaches or contacts the lower end of the final blow mold, the bottom mold having the convex portion for forming the folded-back portion is advanced in the direction of the cavity, whereby the wall thicknesses of the surrounding wall portion and the ground portion outward thereof can be reliably rendered large. These measures result in the heat-resistant container in which when the interior falls into a reduced-pressure atmosphere, the raised bottom portion is displaced toward the interior to accommodate pressure reduction reliably. Moreover, the thick-walled surrounding wall portion ensures the self-supporting properties of the heat-resistant container.

A method for production of a heat-resistant container according to a third embodiment in the present invention is the method for production of a heat-resistant container according to the second embodiment, wherein the ratio between the wall thickness (t1) of the raised bottom portion and the wall thickness (t2) of the surrounding wall portion (raised bottom portion/surrounding wall portion) is 0.85 or less (t1/t2≤0.85).

A method for production of a heat-resistant container according to a fourth embodiment in the present invention is the method for production of a heat-resistant container according to the third embodiment, wherein as a heating temperature for the bottom section, a temperature in the second blow molding is equal to or higher than a temperature in the first blow molding.

A method for production of a heat-resistant container according to a fifth embodiment in the present invention is the method for production of a heat-resistant container according to the fourth embodiment, wherein the second blow molding is performed to shape the raised bottom portion into an inclined portion which extends from the surrounding wall portion diametrically inwardly in succession to the folded-back portion and inclines outwardly, and a central portion which is disposed in a center of the raised bottom portion in succession to the inclined portion and is concave inwardly, and an angle between the surrounding wall portion and the inclined portion in a cross-sectional shape of the raised bottom portion is set at 90 degrees±15 degrees.

The molded product is preferably one in which the length in the axial direction is equal to or smaller than several times the diameter of the mouth section, and the molded product is preferably applied to the production of a wide-mouthed heat-resistant container in which there is not much difference between the diameter of the mouth section and the length in the axial direction.

Effects of the Invention

The present invention makes it possible to mold a heat-resistant container capable of coping unerringly with deformation due to a reduced-pressure atmosphere, regardless of the shape of the wall surface of the container.

DESCRIPTION OF PREFERRED EMBODIMENT(S)

Mode for Carrying Out the Invention

A heat-resistant container will be described based on FIG. 1 to FIGS. 3(a) and 3(b).

Figure 1:
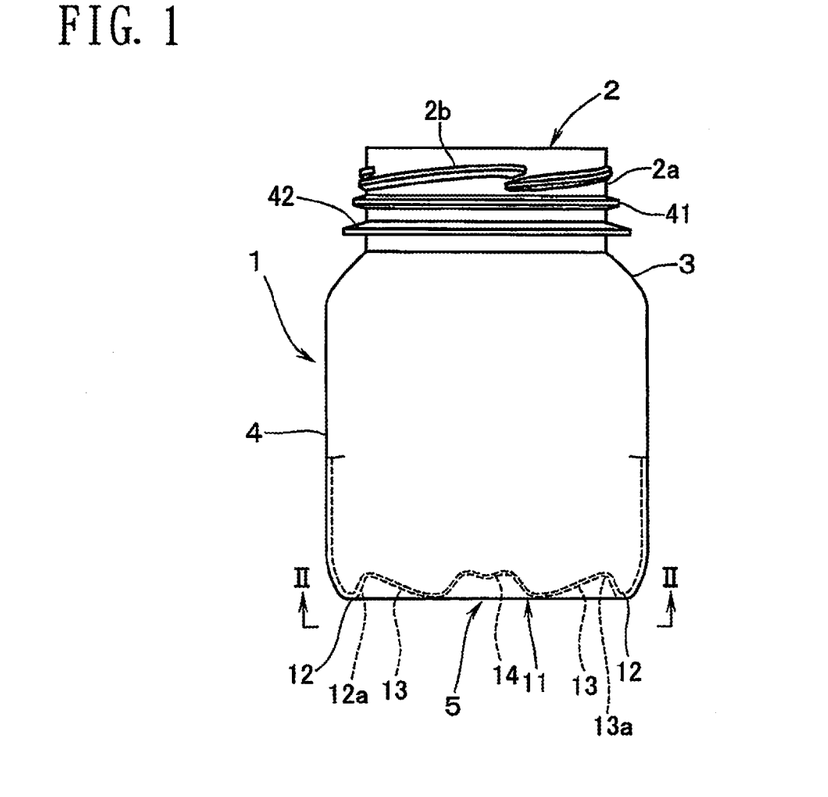
FIG. 1 is a side view of a heat-resistant container molded by a method for production of a heat-resistant container according to an embodiment of the present invention.
Figure 2:
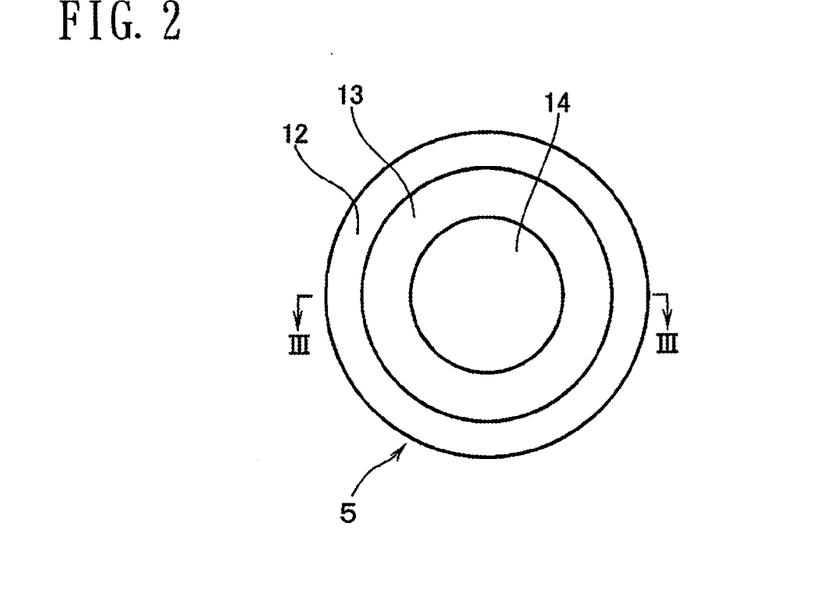
FIG. 2 is a view taken along arrows II-II in FIG. 1.
Figure 3:
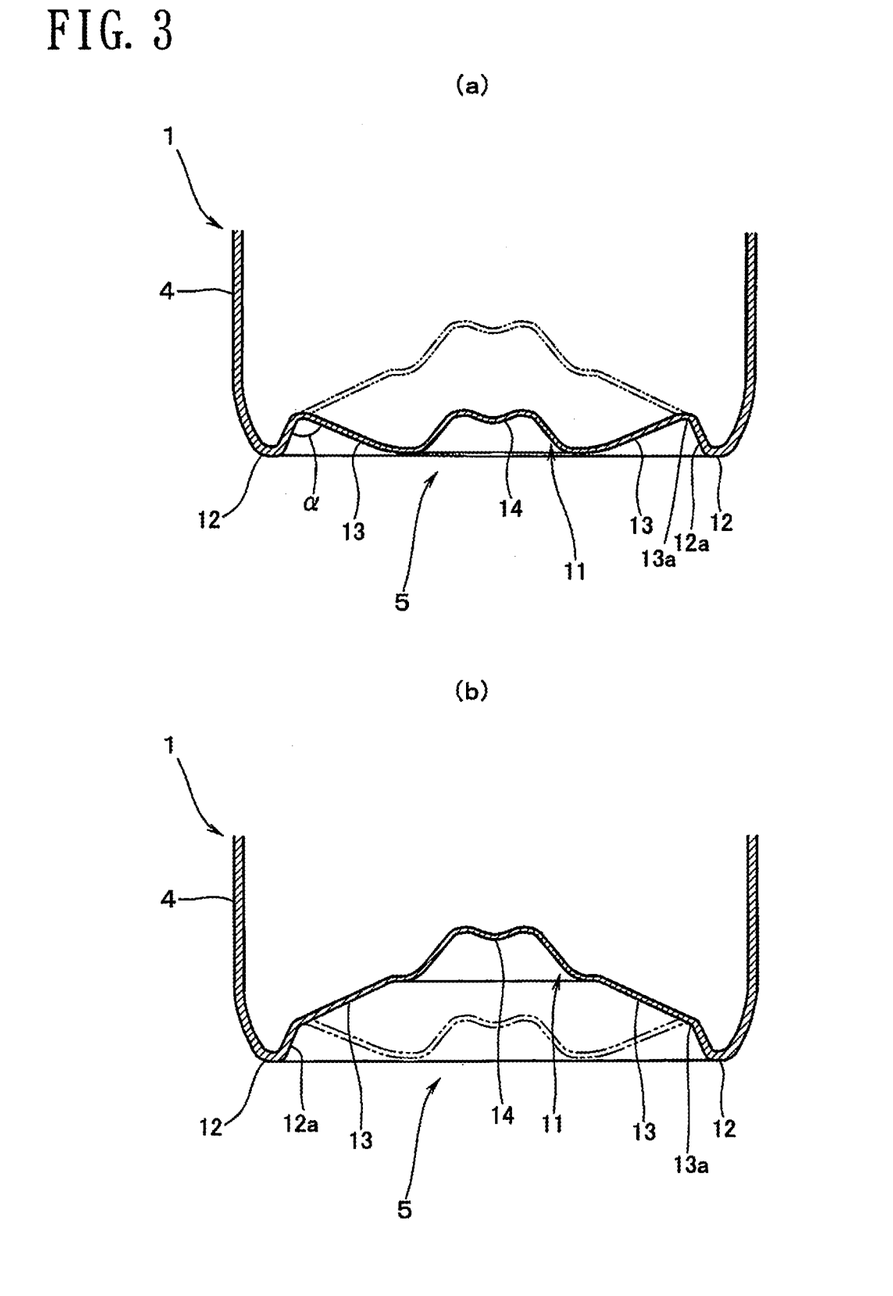
FIGS. 3(a), 3(b) are views taken along arrows III-III in FIG. 2.

FIG. 1 shows a side of a heat-resistant container molded by a method for production of a heat-resistant container according to an embodiment of the present invention. FIG. 2 shows a bottom of the container in FIG. 1 (a view taken along arrows II-II in FIG. 1). FIGS. 3(a) and 3(b) show cross sections of a bottom section of the container (views taken along arrows III-III in FIG. 2). FIG. 3(a) illustrates a state in which the bottom section is not still displaced, while FIG. 3(b) illustrates a state in which the bottom section has been displaced under a reduced-pressure atmosphere.

As shown in FIG. 1, a heat-resistant container 1 molded by a production method according to an embodiment of the present invention is formed from polyethylene terephthalate (PET), and is used, for example, as a container for a semisolid food such as jam or mayonnaise. The heat-resistant container 1 has a wide-mouthed mouth section 2 at its upper end, and has a nearly cylindrical barrel section 4 continuous with a shoulder section 3, the bottom of the barrel section 4 being closed with a bottom section 5.

The heat-resistant container 1 is prepared by biaxially stretch blow molding an injection-molded preform of polyethylene terephthalate, and its sections other than the mouth section 2 are in a biaxially stretched state. Moreover, the sections other than the mouth section 2 are given high resistance to heat by the actions of crystallization and removal of internal stress ascribed to heat setting. The mouth section 2 should also be desirably converted into white crystals to gain heat resistance.

The shape of the barrel section 4 of the heat-resistant container 1 illustrated is nearly cylindrical. However, this is not limitative, and its cross-sectional shape may be a polygonal shape such as a nearly quadrilateral shape or a nearly elliptical shape. The mouth section 2 has a mouth tubular portion 2a, and an engaged portion 2b which enables the mouth tubular portion 2a to be engaged with a cap. As shown in the drawing, the engaged portion 2b can be formed, for example, from a thread. If the thread is used for the engaged portion 2b, the thread may be a single-start thread or a multi-start thread having N or more starts (N denotes an integer of 2 or larger, preferably $4 \leq N \leq 6$). The multi-start thread is advantageous, particularly, in a wide-mouthed container (e.g., 250 mL to 1,500 mL) having a large mouth diameter (e.g., 38 mm or more), because the heat-resistant container 1 can be opened or closed, for example, by rotating the cap one-fourth to one-sixth of a turn.

In FIG. 1, a locking ring 41 (also called a bead ring) and a support ring 42 (also called a neck ring) are provided in the mouth section 2. The locking ring 41 and the support ring 42 can be omitted in the production of the heat-resistant container 1 according to the present invention. That is, with the wide-mouthed container, it is possible to dispense with the locking ring 41 which is needed for a narrow-mouthed container (a container mainly for a beverage). By eliminating the locking ring 41, the total height of the mouth section 2 ranging from the top surface to a lower surface of the support ring 42 can be decreased (for example, to 15 mm or less). Correspondingly, the amount of the resin can be reduced, and the weight reduction of the container can be achieved.

Figure 8:
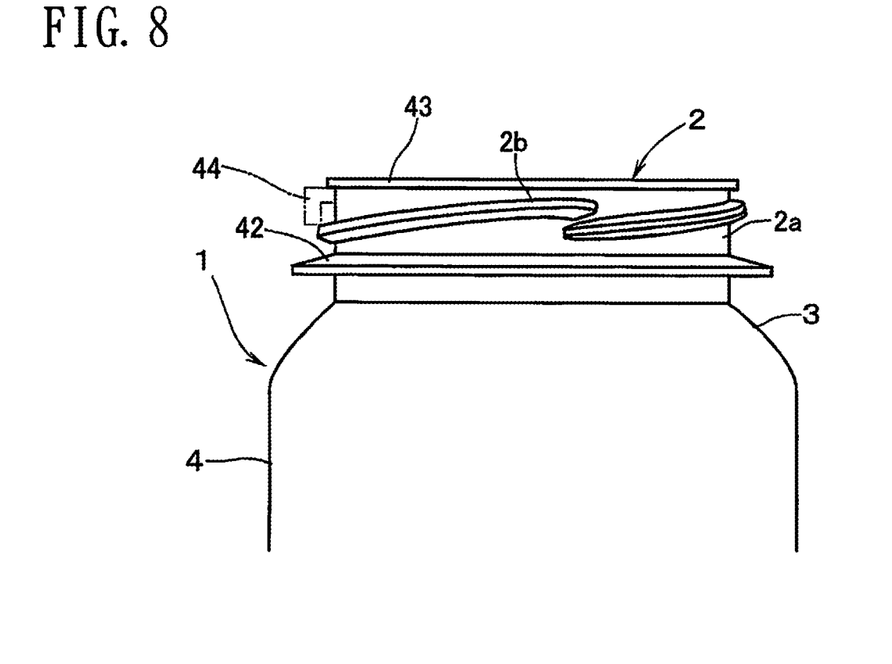
FIG. 8 is a side view of essential parts of a heat-resistant container according to another embodiment of the present invention.

Generally, with the wide-mouthed container, the mouth section has a thicker wall than that of a narrow-mouthed container, so that the amount of the resin consumed is larger. However, as shown in FIG. 8, for example, a flange 43 flush with the top surface and increased in area in the circumferential direction is provided in the mouth section 2, and the mouth tubular portion 2a continuous with the flange 43 is rendered thin-walled, with the locking ring 41 (see FIG. 1) being eliminated. By so doing, the amount of the resin can be cut down, and the container can be made lightweight. For example, the thickness of the top surface of the mouth section including the flange is set at 1.5 to 2.5 mm, and the thickness of the mouth tubular portion is set at 1.0 to 2.0 mm. Under these conditions, the mouth section can be formed satisfactorily, and the amount of the resin consumed can be kept small. Moreover, a chuck member 44 is used for support and engagement of the flange 43, whereby the preform and the container can be transported stably. If the flange 43 is provided, the height of the flange 43 (the height outward in the diametrical direction) needs to be smaller than that of the engaged portion of the mouth section, in consideration of the engagement with the cap.

The support ring 42 is adopted, mainly because it advantageously works for the transport of the preform or container. For example, the support ring 42 as well as the flange 43 is supported and engaged through the chuck member 44. As a result, the preform or container can be transported stably, and the direction of the preform or container can be easily rotated (for example, reversed through 180 degrees). Moreover, the support ring 42 can be omitted.

Figure 9:
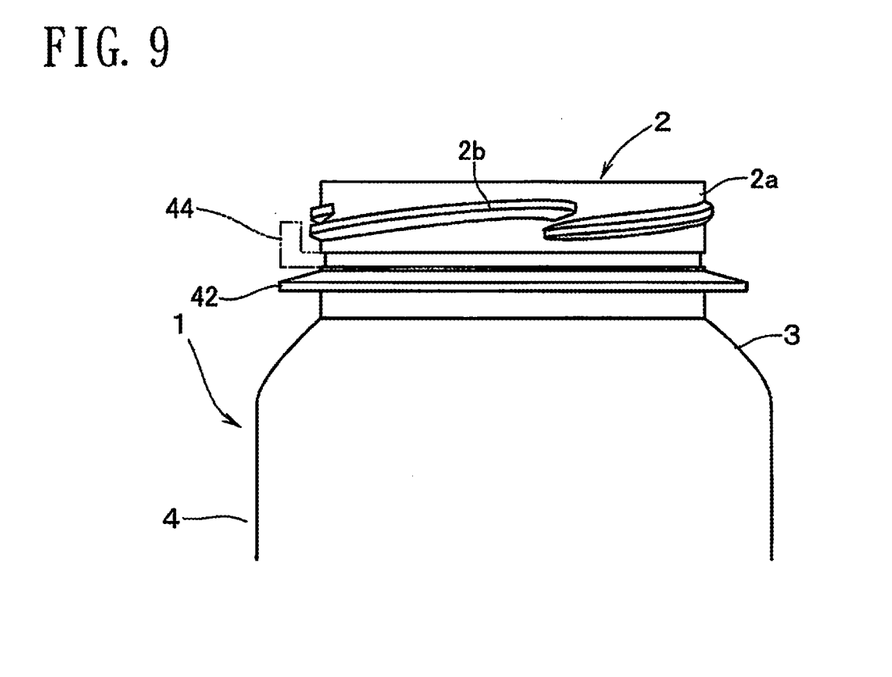
FIG. 9 is a side view of essential parts of a heat-resistant container according to still another embodiment of the present invention.

As shown in FIG. 9, it is also possible to provide a circumferential concavity 45, which the chuck member 44 engages, directly below the engaged portion 2b. In this case, it is necessary to consider that the upper limit of the depth of the circumferential concavity 45 exists in relation to the wall thickness of the mouth section 2. If the depth of the circumferential concavity 45 is rendered larger than this upper limit, resin flow during injection molding of the preform may be inhibited, and a molding defect such as a short shot may occur. Thus, if the thickness of the mouth section 2 is set at 1.5 mm, for example, the depth of the circumferential concavity 45 is limited to a value of the order of 0.5 mm.

As shown in FIGS. 1 to 3(a), 3(b), the bottom section 5 is provided with a thin-walled raised bottom portion 11 and an annular ground portion 12 having an increased wall thickness, and a surrounding wall portion 12a is provided inwardly of the ground portion 12. That is, the ground portion 12, the surrounding wall portion 12a inward of the ground portion 12, and a wall portion outward of the ground portion 12 constitute a surrounding section. The raised bottom portion 11 is composed of an inclined portion 13 which extends from the surrounding wall portion 12a diametrically inwardly via a folded-back portion 13a and inclines outwardly (downwardly), and a central portion 14 which is disposed in the center of the bottom section 11 inwardly of and in succession to the inclined portion 13 and is concave toward the interior of the heat-resistant container 1.

As shown in FIG. 3(a), an angle cc between the surrounding wall portion 12a and the inclined portion 13 in the cross-sectional shape of the bottom section 5 is set at 90 degrees±15 degrees. If the angle is set at an acute angle smaller than such an angle, a spontaneous inverting action of the raised bottom portion 11 under a reduced-pressure atmosphere may be impeded. Setting the above angle can also prevent unexpected damage to the thin-walled folded-back portion 13a.

The (raised bottom portion 11/surrounding wall portion 12a) ratio, which is the ratio between the wall thickness of the raised bottom portion 11 and the wall thickness of the surrounding wall portion 12a, is set at 0.85 or less (the wall thickness of the raised bottom portion 11 is 85% or less of the wall thickness of the surrounding wall portion 12a). In this case, for example, the wall thickness of the barrel section 4 is set at 0.6 mm to 0.7 mm, the wall thickness of the raised bottom portion 11 (inclined portion 13 and central portion 14) is set at about 0.4 mm, and the wall thickness of the surrounding wall portion 12a (ground portion 12) is set at 0.5 mm to 0.6 mm. Under these wall thickness conditions, the inverting action of the bottom section 5 under a reduced-pressure atmosphere is performed stably and spontaneously. Moreover, the surrounding wall portion 12a (ground portion 12) has a larger wall thickness than that of the raised bottom portion 11. Thus, it shows sufficient rigidity and, during the inversion of the raised bottom portion 11, the surrounding wall portion 12a (ground portion 12) does not deform, but can retain self-supporting properties.

The heat-resistant container 1 is filled with a material, which will serve as contents, in a high-temperature state. When the contents are then cooled by an external cooling means or the like, the interior of the heat-resistant container 1 falls into a reduced-pressure atmosphere because of a decrease in the volume of the contents. When the interior of the heat-resistant container 1 is in the reduced-pressure atmosphere, the raised bottom portion 11 is displaced toward the inside of the heat-resistant container 1 and responds to the reduced pressure, as shown in FIG. 3(b), because the wall thickness of the raised bottom portion 11 (inclined portion 13) is small compared with the ground portion 12 (surrounding wall portion 12a). Thus, the deformation of the barrel section 4 can be eliminated, without the formation of a pressure reduction panel or the like in the barrel section 4, that is, regardless of the shape of the wall surface (barrel section 4).

Since there are no restrictions on the shape of the barrel section 4, there is no need to form a stepped portion or the like on the inner wall side of the barrel section 4. Thus, no restrictions are imposed any more on the design of the product label or the contents of its indications. Moreover, it is unlikely that there will be a part, which a spoon or the like does not reach, when a food such as jam or mayonnaise is scooped with the spoon or the like. Hence, the contents can be used up.

A production method for forming the above-described heat-resistant container 1 will be explained based on FIGS. 4 to 6.

Figure 4:
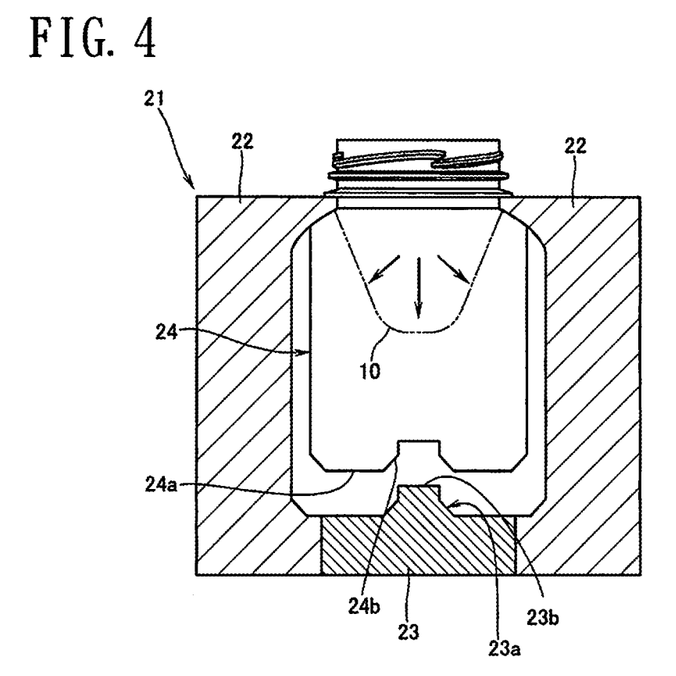
FIG. 4 is an explanation drawing of steps for performing the method for production of a heat-resistant container according to the embodiment of the present invention.
Figure 5:
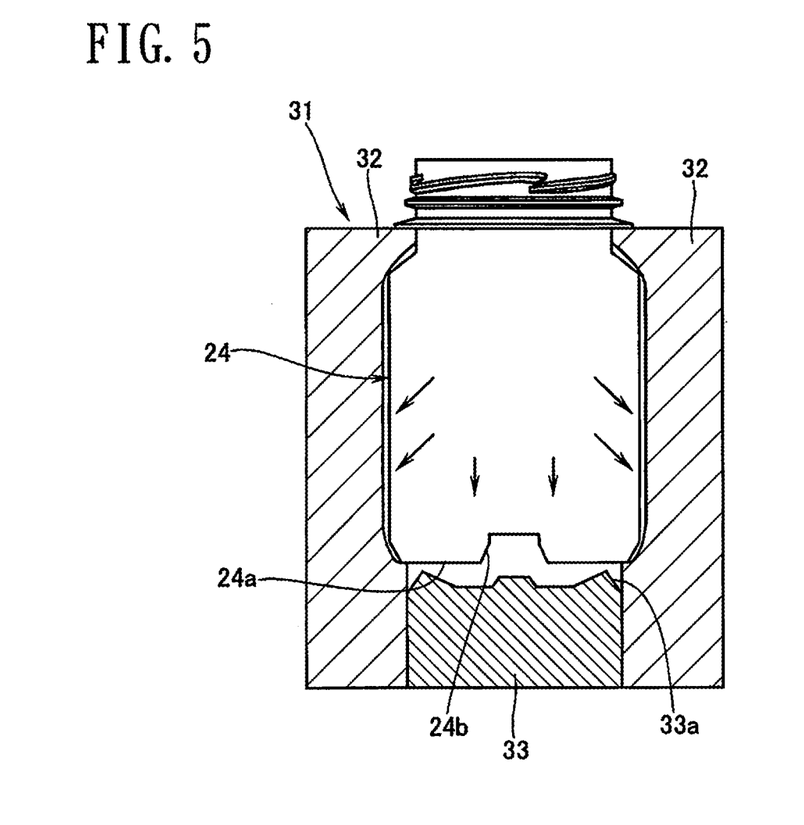
FIG. 5 is an explanation drawing of the steps for performing the method for production of a heat-resistant container according to the embodiment of the present invention.
Figure 6:
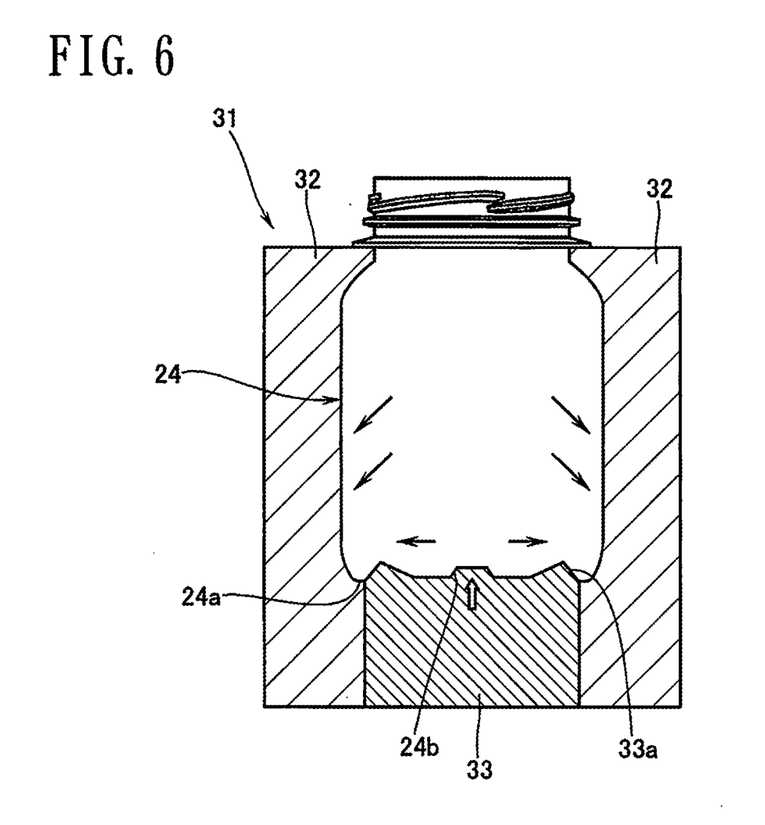
FIG. 6 is an explanation drawing of the steps for performing the method for production of a heat-resistant container according to the embodiment of the present invention.

FIGS. 4 to 6 illustrate steps for performing the production method for a heat-resistant container according to the embodiment of the present invention. FIG. 4 shows a state in which a preform is molded by a heat-treating blow mold (first blow molding). FIG. 5 shows a state in which the final shape of the barrel section is created by a final blow mold. FIG. 6 shows a state in which the bottom section of the container is formed into a final shape with the use of a raised bottom mold which can be advanced and retreated in the direction of a blow cavity (second blow molding).

As shown in FIG. 4, a preform 10 (indicated by a dashed line in the drawing) heated to a suitable stretch temperature is disposed in a heat-treating blow mold 21. The heat-treating blow mold 21 is equipped with an openable/closable primary split mold 22 and a primary bottom mold 23. The cavity space of this heat-treating blow mold is larger than that of the final blow mold. In blow molding by the heat-treating blow mold, therefore, a primary blow molded product is blown up into a size larger than that of a final blow molded product until a moment immediately before discharge of blowing air.

With the heat-treating blow mold 21 being controlled to a temperature of, say, 140° C. to 200° C., and the primary bottom mold 23 being controlled to a temperature of, say, 90° C. to 120° C., the preform 10 is blow molded to form a primary blow molded product 24 (indicated by solid lines in the drawing) (first blow molding). The primary bottom mold 23 has formed therein, for example, a convex portion 23a protruding in the middle of the bottom mold in a reverse-tapered form gradually decreasing in diameter toward the interior of the cavity, and a circumferential support surface 23b located at the top of the convex portion 23a. After introduction of blowing air, the bottom of the preform first contacts the circumferential support surface 23b, and is then stretched along the reverse-tapered convex portion 23a. This protruding convex portion 23a can increase the stretched region of the raised bottom portion 11 as compared with a nearly hemispherical ordinary bottom mold. Since the convex portion 23a is in the form of a reverse taper, moreover, the raised bottom portion 11 can be highly stretched and oriented without much difficulty. As a result, a thin-walled raised bottom portion 11 can be molded stably. In the drawing, the ends of the support surface 23b are indicated by nearly right-angled shapes, but actually, these ends are chamfered with a certain radius. In order to increase the stretched region further, a hemispherical concave portion, for example, can be provided on the top of the support surface 23b.

With the blow molding using the heat-treating blow mold 21, the product is brought into contact with the primary split mold 22 and the primary bottom mold 23 for a certain time, for example, 2 seconds to 10 seconds, whereby its crystallization is promoted and internal stress is removed. After an elapse of the certain time, discharge of blowing air is started, whereupon the product shrinks to become the primary blow molded product 24 (indicated by the solid lines in the drawing) in which the raised bottom portion 11 (see FIGS. 3(a), 3(b)) smaller in wall thickness than the surrounding wall portion 12a (ground portion 12) (see FIGS. 3(a), 3(b)) is shaped.

As shown in FIG. 5, the primary blow molded product 24 is disposed in a final blow mold 31. The final blow mold 31 is equipped with an openable/closable secondary split mold 32 and a secondary bottom mold 33. On the periphery of the upper surface of the second bottom mold 33, a convex portion 33a is provided for forming the folded-back portion 13a. The final blow mold 31 is temperature-controlled, for example, to 80° C. to 200° C., and the primary blow molded product 24 is blow molded (second blow molding). The temperature of the secondary bottom mold 33 is adjusted, for example, to one between 30° C. (room temperature) and 120° C. When its temperature is controlled to a high temperature, a further increase in crystal density can be expected. In the state illustrated in FIG. 5, the primary blow molded product 24 contacts the secondary split mold 32, whereby its crystallization is further promoted to impart a final shape to the barrel section 4 (see FIG. 1).

As shown in FIG. 6, the secondary bottom mold 33 is pushed up during the blow molding of the primary blow molded product 24 (simultaneously with second blow molding), whereby a site corresponding to the folded-back portion 13a (see FIGS. 3(a), 3(b)) is pressed from outside. By this procedure, the surrounding wall portion 12a (ground portion 12) located on the outer peripheral side of the folded-back portion 13a is inhibited from stretching and thinning. As a result, the surrounding wall portion 12a (ground portion 12) can be rendered thick-walled (rendered relatively thick-walled) in comparison with the raised bottom portion 11 (inclined portion 13). Then, the product is held in this state for a certain time, for example, 2 seconds to 10 seconds, whereafter the product is cooled by a technique such as cooling air, and a final molded product is withdrawn.

Moreover, molding procedures corresponding to the first blow molding and the second blow molding can be performed using two blow molding machines. In this case, it goes without saying that a device, which reheats the primary blow molded product 24 cooled to room temperature to a temperature suitable for the second blow molding, is separately needed.

In the first blow molding, the highly stretched and oriented thin-walled raised bottom portion can be easily formed by the heat-treating blow mold having a larger cavity space than the final molded product, and the bottom mold having the convex portion protruding toward the cavity. In the second blow molding, when the bottom part of the primary blow molded product approaches or contacts the lower end of the final blow mold, the secondary bottom mold 33 having the convex portion 33a for forming the folded-back portion 13a is advanced toward the cavity. By so doing, the surrounding wall portion 12a, the ground portion 12, and the peripheral wall outward of them can be reliably rendered thick-walled as compared with the raised bottom portion 11 (inclined portion 13).

Particularly by performing blow molding in two phases, it becomes possible to carry out the wall thinning of the container raised bottom portion by high stretching/orientation, the shaping and wall thickening of the ground portion 12, etc. in a separate manner. This two-phase process has superiority in molding over a process blowing only in a single drawing which has to fulfill both of the requirements at a time. Compared with the single blowing process, moreover, the two-drawing process is capable of higher stretching and orientation and heat setting at a higher temperature. Thus, rigidity and heat resistance also improve. If the bottom mold is a fixed one, rather than a movable one, a bottom part of the preform first contacts the folded-back portion 33a of the raised bottom mold during the stretching step, and then the bottom wall part wraps around the surrounding wall portion 12a. On this occasion, the raised bottom portion 11 and the inclined portion 13 tend to become thick-walled, while the ground portion 12

(surrounding wall portion 12a) tends to become thin-walled. These tendencies occur particularly in the single blow molding process.

Furthermore, the panel-free configuration of the barrel section 4 can be realized, with the result that there are no restrictions on the barrel section 4. Thus, the degree of freedom in the shape of a product label or the design of the container is increased. Besides, semisolid contents of the container, such as jam, can be easily scooped out with a spoon or the like, and the contents can be used up.

In the present invention, the crystal density of the container is increased by heat setting. Thus, the container has sufficient rigidity, but its rigidity may be supplemented with the addition of minimum amounts of ribs. For example, it is conceivable to provide ribs immediately below the shoulder section 3 and at a site between the vicinity of the ground portion 12 and a lower part of the barrel section 4. By this means, an ample space for application of a label, for example, can be ensured, and design limitations can be minimized.

Situations where the heat-resistant container 1 is filled with a material to serve as contents will be described based on FIGS. 7(a) to 7(c).

Figure 7:
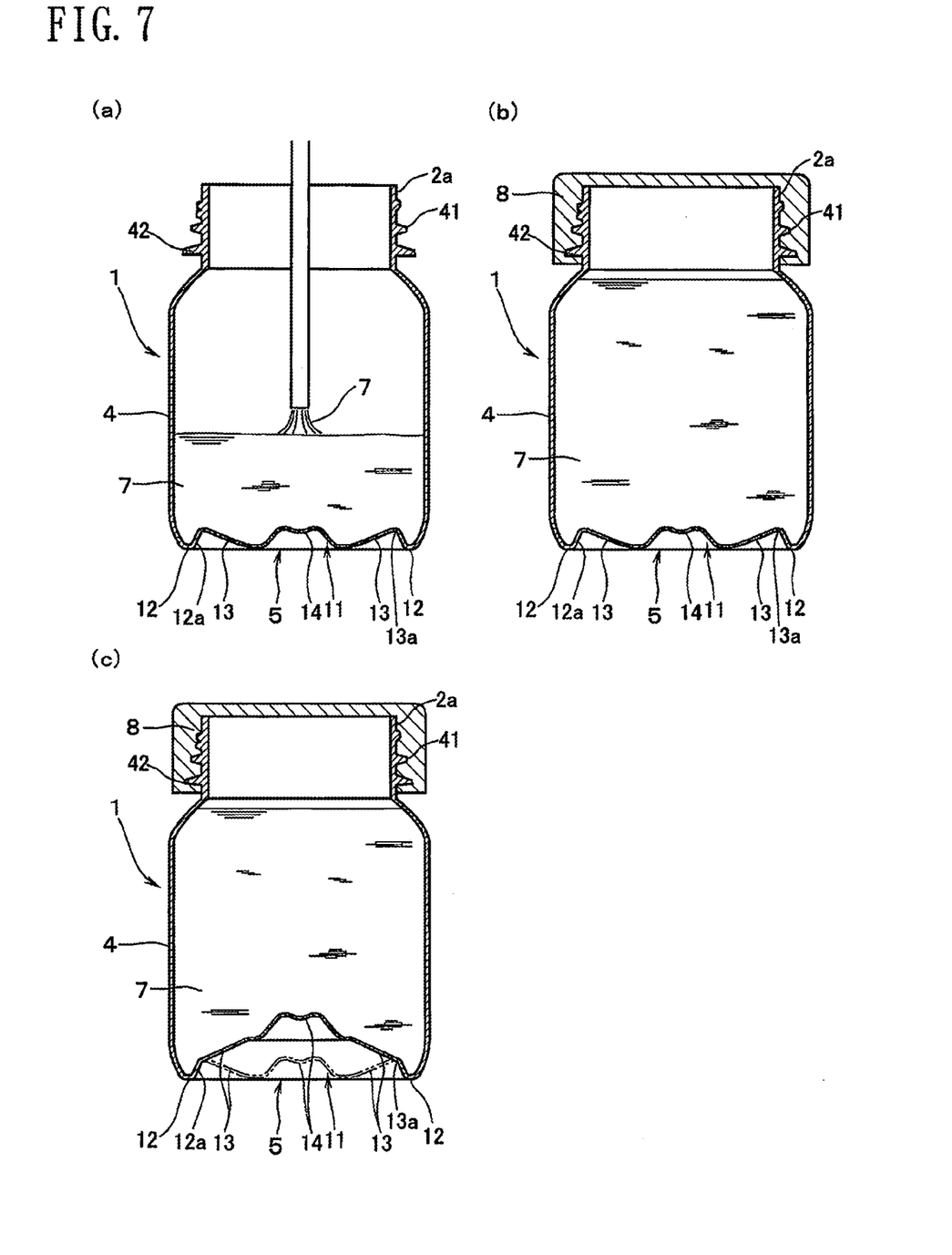
FIGS. 7(a) to 7(c) are explanation drawings of situations where a heat-resistant container 1 is filled with a material to become contents.

FIG. 7(a) illustrates the process of filling the container with a material to become contents. FIG. 7(b) shows a state in which the filling is completed and the container is sealed with a cap. FIG. 8 shows a state in which the contents are cooled and decreased in volume.

As shown in FIG. 7(a), a material to become contents 7 is filled into the heat-resistant container 1, the material having a temperature raised by sterilization or the like. As shown in FIG. 7(b), upon completion of the filling of the material as the contents 7, the mouth section 2 is closed with a cap 8 to seal the interior of the container. With the mouth section 2 being closed with the cap 8, the container is cooled or stored, whereby the contents 7 are cooled.

When the contents 7 of the closed heat-resistant container 1 are cooled, the volume of the contents is decreased to bring the interior of the heat-resistant container 1 into a reduced-pressure atmosphere. Under the reduced-pressure atmosphere, the raised bottom portion 11 is displaced inwardly, as shown in FIG. 7(c), to accommodate deformation due to the pressure reduction.

In the above-mentioned manner, when the interior comes into the reduced-pressure atmosphere, the raised bottom portion 11 is displaced inward to form the heat-resistant container 1 responsive reliably to the reduced pressure. The thick-walled ground portion 12 ensures the self-supporting properties of the heat-resistant container 1. Thus, the heat-resistant container 1 can unerringly deal with deformation in response to the reduced-pressure atmosphere, whatever the shape of the wall surface is.

INDUSTRIAL APPLICABILITY

The present invention can be utilized in the industrial field of a method for production of a heat-resistant container, the method preparing a heat-resistant container made of resin by blow molding.

EXPLANATIONS OF LETTERS OR NUMERALS

1 Heat-resistant container
2 Mouth section
3 Shoulder section
4 Barrel section
5 Bottom section
7 Contents
10 Preform
11 Raised bottom portion
12 Ground portion
13 Inclined portion
14 Central portion
21 Heat-treating blow mold
22 Primary split mold
23 Primary bottom mold
24 Primary blow molded product
31 Final blow mold
32 Secondary split mold
33 Secondary bottom mold
41 Locking ring
42 Support ring
43 Flange
44 Chuck member
45 Circumferential concavity Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A method for production of a heat-resistant container, comprising:
    forming a raised bottom portion, which is displaced inwardly a predetermined amount and which is smaller in wall thickness than a surrounding section, in a bottom section of a molded product; and
    performing blow molding to form a folded-back portion and a surrounding wall portion which surround the raised bottom portion,
    wherein when the blow molding is performed, a site of the bottom section is pressed from outside, whereby the folded-back portion and the surrounding wall portion are formed, with the surrounding wall portion being inhibited from thinning, so that the raised bottom portion will be further displaced inwardly beyond the predetermined amount in response to reduction of internal pressure.

2. The method for production of a heat-resistant container according to claim 1, further comprising:
    forming the raised bottom portion smaller in wall thickness than the surrounding wall portion by first blow molding involving heat treatment; and
    pressing the site of the bottom section including the folded-back portion and the surrounding wall portion, in performing second blow molding using a final mold, to inhibit the surrounding wall portion from thinning.

3. The method for production of a heat-resistant container according to claim 2, wherein
    a ratio between a first wall thickness (t1) of the raised bottom portion and a second wall thickness (t2) of the surrounding wall portion is 0.85 or less (t1/t2≤0.85).

4. The method for production of a heat-resistant container according to claim 3, wherein
    as a heating temperature for the bottom section, a temperature in the second blow molding is equal to or higher than a temperature in the first blow molding.

5. The method for production of a heat-resistant container according to claim 4, wherein
    the second blow molding is performed to shape the raised bottom portion into an inclined portion which extends from the surrounding wall portion diametrically inwardly in succession to the folded-back portion and inclines outwardly, and a central portion which is disposed in a center of the raised bottom portion in succession to the inclined portion and is concave inwardly, and an angle between the surrounding wall portion and the inclined portion in a cross-sectional shape of the raised bottom portion is set at 90 degrees±15 degrees.

* * * * *